United States Patent
Wang (10) Patent No.: US 9,174,599 B2
(45) Date of Patent: Nov. 3, 2015

(54) ADJUSTBALE PET FENCE IN VEHICLE (71) Applicant: KING RACK INDUSTRIAL CO., LTD., Taichung (TW)

(72) Inventor: Chiu-Kuei Wang, Taichung (TW)

(73) Assignee: KING RACK INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 14/555,546

(22) Filed: Nov. 26, 2014

(65) Prior Publication Data

US 2015/0145270 A1    May 28, 2015

(30) Foreign Application Priority Data

Nov. 27, 2013   (TW) .............................. 102222234 U (51) Int. Cl.
 B62D 33/04 (2006.01)
 B60R 21/02 (2006.01)
 A01K 1/02 (2006.01)

(52) U.S. Cl.
 CPC ............. *B60R 21/026* (2013.01); *A01K 1/0272* (2013.01)

(58) Field of Classification Search
 CPC ....................................................... B60R 21/06
 USPC .................... 296/24.31, 24.4, 24.43, 24.46
 See application file for complete search history.

(56) References Cited

U.S. PATENT DOCUMENTS

| 2,982,579 | A | * | 5/1961 | Greenwald | 296/24.4 |
| 3,190,686 | A | * | 6/1965 | Smiler | 296/24.46 |
| 7,017,520 | B2 | * | 3/2006 | Wang | 119/412 |
| 8,573,664 | B2 | * | 11/2013 | Beechie | 296/24.31 |
| 2003/0057722 | A1 | * | 3/2003 | Dolman | 296/24.1 |
| 2007/0210597 | A1 | * | 9/2007 | Wang | 296/24.43 |
| 2012/0181808 | A1 | * | 7/2012 | Reed et al. | 296/24.31 |
| 2014/0232131 | A1 | * | 8/2014 | Link et al. | 296/24.31 |

* cited by examiner

*Primary Examiner* — Hilary Gutman (57) ABSTRACT

A pet fence includes a first part having multiple first bars, and two second parts each having multiple second bars are slidably connected to the first part. Two positioning tubes are connected to the first part and each have first holes and second holes. Multiple adjustment units connect the first part to the second parts, and each adjustment unit is cooperated with a locking unit which extends through one of the first holes the positioning tubes. When the locking unit is loosened, the two second parts are movable relative to the first part to adjust the width of the pet fence. At least one clamp unit is connected to one of the second holes of the positioning tube to secure the at least one clamp unit to the headrest rod the seat of a vehicle.

6 Claims, 8 Drawing Sheets

ADJUSTBALE PET FENCE IN VEHICLE

BACKGROUND OF THE INVENTION

1. Fields of the Invention

The present invention relates to a pet fence, and more particularly, to an adjustable pet fence used in a vehicle.

2. Descriptions of Related Art

Many people carry their pets such as dogs with them to travel, and the pets are usually put in the rear space of a vehicle where the backseat is located. For a hatch-back vehicle, the pet enters the vehicle from the back of the vehicle, for a sedan, the pet has to be put in the backseat. However, the pet may sometimes jump to the front seat and affect the operation of the driver. Therefore, a pet fence is developed to separate the pet from the driver in the vehicle. A conventional pet fence known to applicant comprises two posts between which a first part and a second part are connected therebetween, each of the first and second parts has multiple transverse bars. The two posts each have a clamp unit connected to a lower end thereof so that the two clamp units are connected to the rods of the headrest of the seat. The tops of the two post are positioned to the ceiling. Each clamp unit has two tubes and each tube has a groove so as to accommodate the rods of the headrest. Each tube has a securing member to secure the tube. An adjustment unit is used to adjust the clamp unit so as to adjust the relative position between the first part and the second part of the pet fence. Each adjustment unit comprises two disks and each disk has a toothed face. A spring is biased between the two respective toothed faces of the two disks, and a bolt extends through the two disks and is cooperated with the bolt.

When adjusting the width of the pet fence to meet the width of the vehicle, the user has to loosen the bolt or nut by using a tool, so as to slightly separate the two toothed faces of the two disks. The second part is then able to move relative to the first part, when the second part is moved to a desired position, the bolt is then tighten to let the bars are clamped between the two disks again. The pet fence may include four to eight clamp units, it takes a lot of time to adjust the width of the pet fence.

The present invention intends to provide an adjustable pet fence and eliminates the shortcomings mentioned above.

SUMMARY OF THE INVENTION

The present invention relates to a pet fence and comprises a first part having multiple first bars transversely connected thereto. At least two second parts each have multiple second bars transversely connected thereto. The width of each second part is smaller than a half width of the first part. At least two positioning tubes each have first holes and second holes which are located at an angle relative to the first holes. Multiple adjustment units each have a first member, a second member and a third member. Each adjustment unit is cooperated with a locking unit which extends through one of the first holes of one of the at least two positioning tubes, the first member, the first part, the second member, one of the two second parts and the third member to connect one of the at least two second parts to the first part. When the locking unit is loosened, the at least two second parts are movable relative to the first part. At least one clamp unit has a connection tube and an attachment member. A fixed clamp is connected to one end of the connection tube, and a movable clamp is connected to the fixed clamp to secure the at least one clamp unit to the headrest rod of the seat of a vehicle. The attachment member is located between the positioning tube and the connection tube. The connection tube and the attachment member are connected to the second holes of the at least two positioning tubes.

Preferably, the first part and the at least two second parts each are an enclosed part.

Preferably, a first enclosed tube is connected to the outer periphery of the first part, and a second enclosed tube is connected to the outer periphery of each of the second parts.

Preferably, the first member is located to face the first part and has a first groove in the first side thereof so as to accommodate the positioning tube. The first member has at least two second grooves in a second side thereof so as to accommodate two of the first bars of the first part. The second member is located between the first part and one of the two second parts. The second member has at least two third grooves in the first side thereof. At least two fourth grooves are defined in the second side of each of the second member. The at least two third grooves accommodate two of the first bars of the first part. The at least two fourth grooves accommodate two of the second bars of one of the second parts. The third member is located to face the second part corresponding thereto and has at least two fifth grooves defined in the first side thereof so as to accommodate two second bars of the second part corresponding thereto.

Preferably, the locking unit comprises a bolt and a nut which is connected to the bolt.

Preferably, the connection tube of the at least one clamp unit has multiple passages which are located corresponding to the second holes of the at least two positioning tubes.

Preferably, the attachment member of the at least one clamp unit comprises two halves between beads are located, the two halves are rotatable relative to each other.

The primary object of the present invention is to provide a pet fence wherein the positioning tube is cooperated with the adjustment unit and the clamp unit to reduce the parts required. Only the clamp unit is clamped to the headrest rod.

Another object of the present invention is to provide a pet fence which has two second parts on two ends of the first part, by adjusting the adjustment units, the two second parts are slidable relative to the first part to adjust the width of the pet fence.

Yet another object of the present invention is to provide a pet fence wherein the two second parts each are an enclosed part and cooperated with one to two adjustment units, so that when adjusting the width of the pet fence, the user only need to operate one to two adjustment units.

A further object of the present invention is to provide a pet fence wherein each of the first part and the two second parts is an enclosed part so that they have better strength and are not deformed.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 6, the pet fence of the present invention comprises a first part 10 having multiple first bars 11 transversely connected thereto. Two second parts 20 are slidably connected to two ends of the first part 10 and able to slide relative to the first part 10. The second parts 20 each have multiple second bars 21 transversely connected thereto. The first part 10 and the two second parts 20 each are an enclosed part. Preferably, a first enclosed tube 12 is connected to the outer periphery of the first part 10, and a second enclosed tube 22 is connected to the outer periphery of each of the second parts 20. The two ends of each of the first bars 11 are connected to the first enclosed tube 12, and the two ends of each of the second bars 21 are connected to the second enclosed tube 22. The gaps between the first bars 11 are equal to those between the second bars 21 in this embodiment. The width of each second part 20 is smaller than a half width of the first part 10.

Two positioning tubes 30 each have first holes 31 and second holes 33 which are located at an angle relative to the first holes 31. Multiple adjustment units 40 each have a first member 41, a second member 42 and a third member 43. Each adjustment unit 40 is cooperated with a locking unit 50 which extends through one of the first holes 31 of one of the two positioning tubes 30, the first member 41, the first part 10, the second member 42, one of the two second parts 20 and the third member 43 to connect one of the two second parts 20 to the first part 10. The locking unit 50 comprises a bolt 51 and a nut 52 which is connected to the bolt 51. When the locking unit 50 is loosened by unlocking the nut 52 from the bolt 51, the two second parts 20 are movable relative to the first part 10 to adjust the width of the pet fence.

In detail, the first member 41 is located to face the first part 10 and has a first groove 411 in the first side thereof so as to accommodate the positioning tube 30. The first member 41 has two second grooves 412 in the second side thereof so as to accommodate two of the first bars 11 of the first part 10. The second member 42 is located between the first part 10 and one of the two second parts 20. The second member 42 has two third grooves 421 in the first side thereof. Two fourth grooves 422 are defined in the second side of each of the second member 42. The two third grooves 421 accommodate two of the first bars 11 of the first part 10. The two fourth grooves 422 accommodate two of the second bars 21 of one of the second parts 20. The third member 43 is located to face the second part 20 corresponding thereto and has two fifth grooves 431 defined in the first side thereof so as to accommodate two second bars 21 of the second part 20 corresponding thereto.

A clamp unit 60 has a connection tube 61 and an attachment member 65. The connection tube 61 of the clamp unit 60 has multiple passages 611 which are located corresponding to the second holes 33 of the at least two positioning tubes 30. A fixed clamp 62 is connected to one end of the connection tube 61, and a movable clamp 63 is connected to the fixed clamp 62 to secure the clamp unit 60 to the headrest rod 73 of the seat 72 of a vehicle 70. The attachment member 65 is located between the positioning tube 30 and the connection tube 61. The connection tube 61 and the attachment member 65 are connected to the second holes 33 of the two positioning tubes 30. The attachment member 65 of the clamp unit 60 comprises two halves between beads are located, the two halves are rotatable relative to each other.

Figure 1:
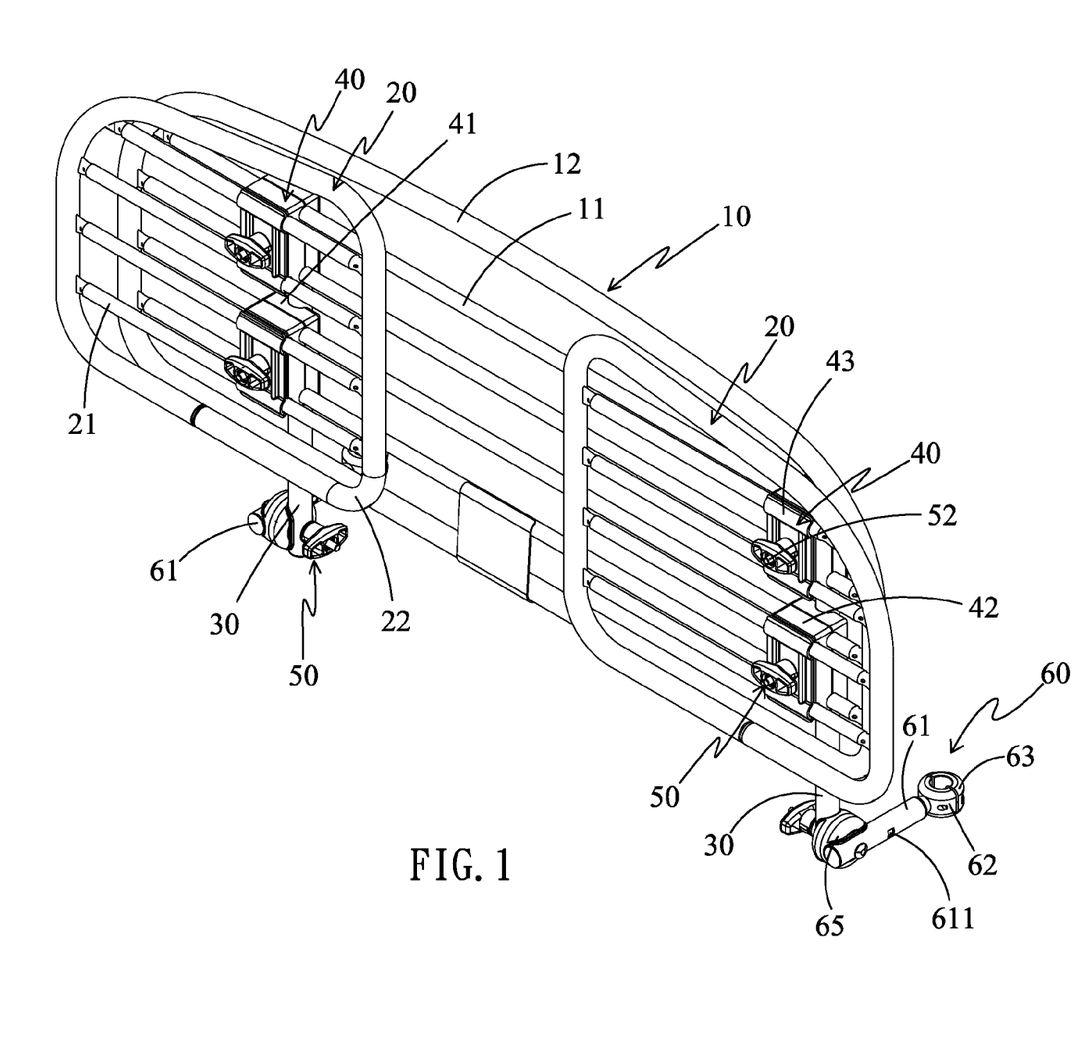
FIG. 1 is a perspective view to show the pet fence of the present invention.
Figure 2:
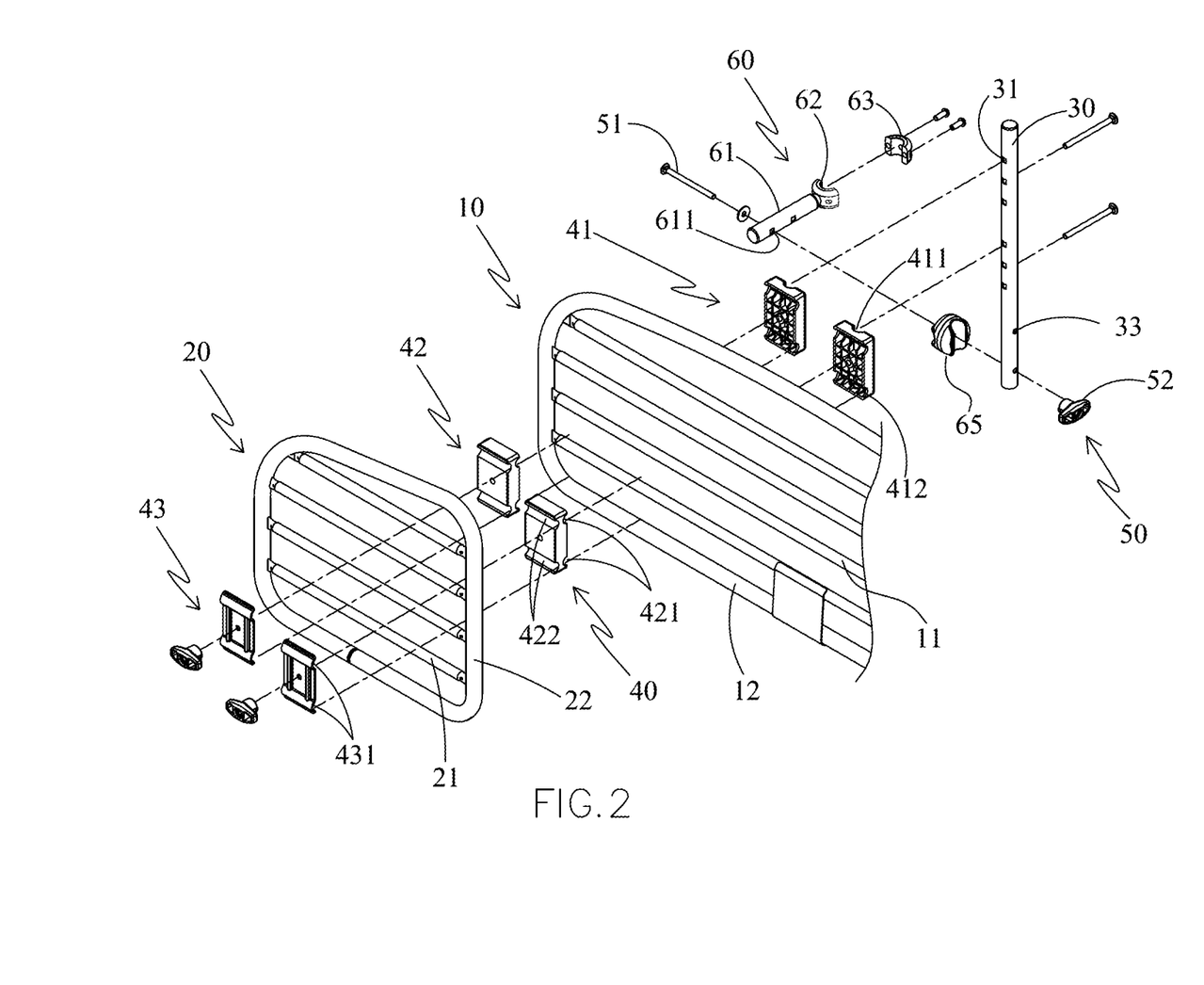
FIG. 2 is an exploded view of the pet fence of the present invention.
Figure 3:
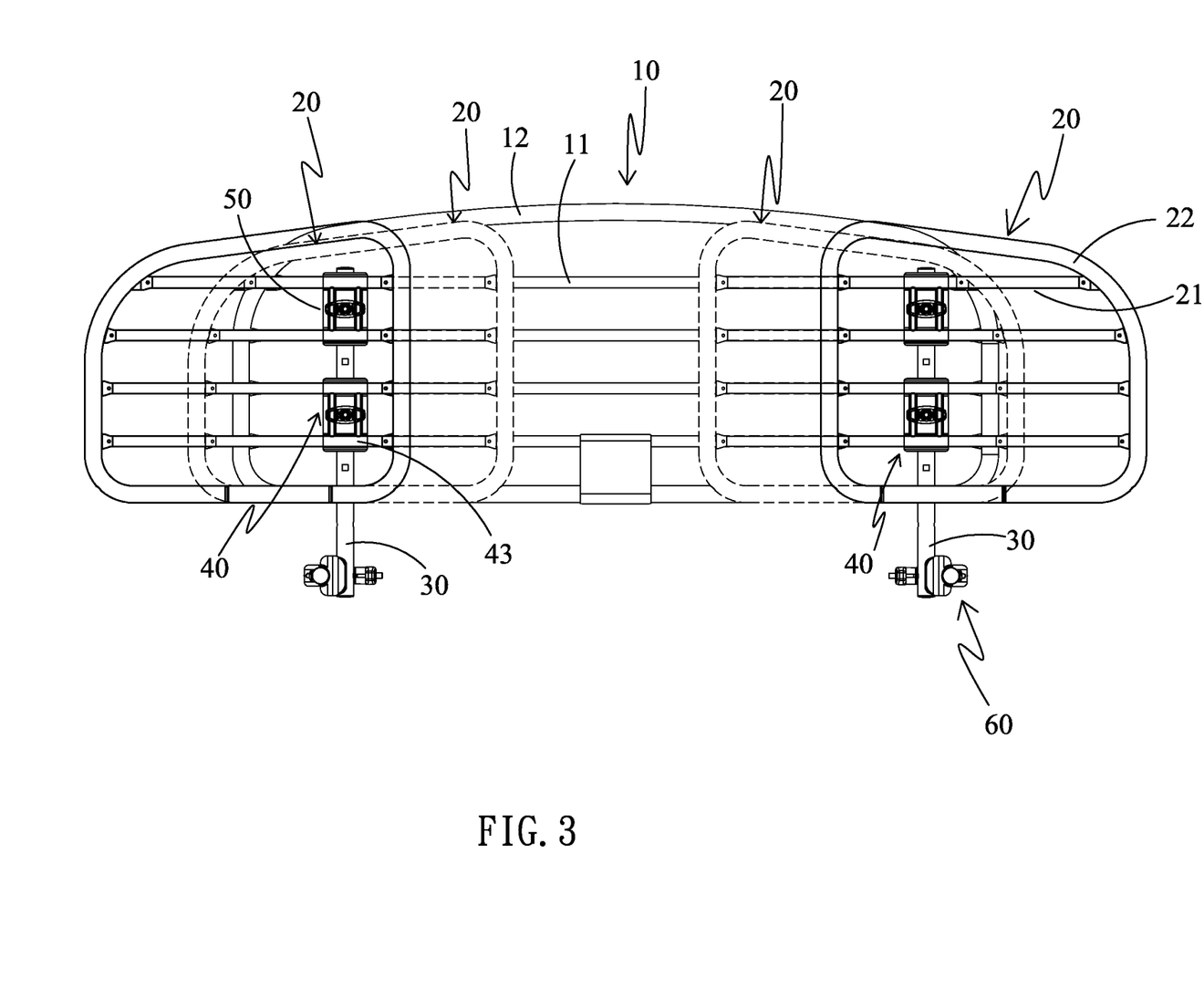
FIG. 3 is a front plan view of the pet fence of the present invention.
Figure 4:
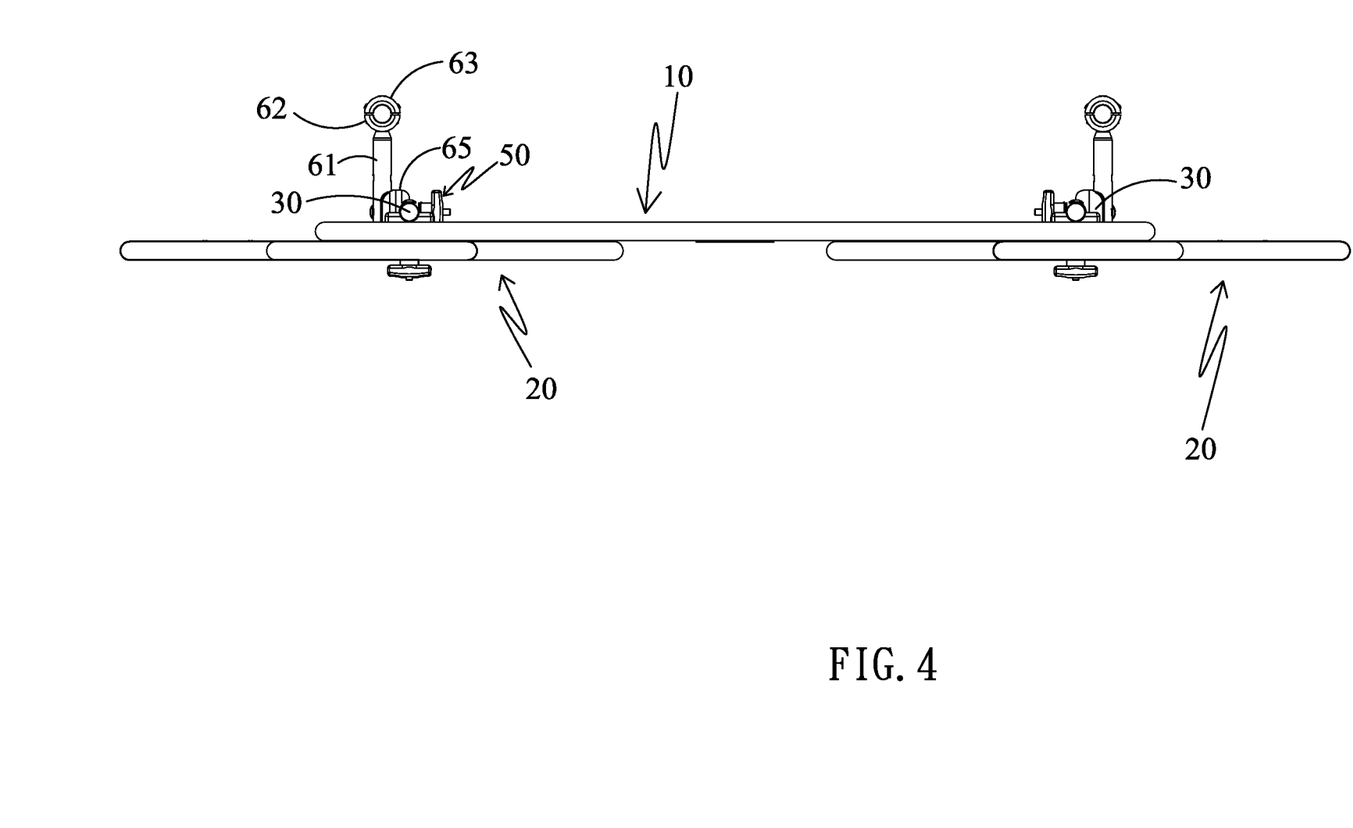
FIG. 4 is a top view of the pet fence of the present invention.
Figure 5:
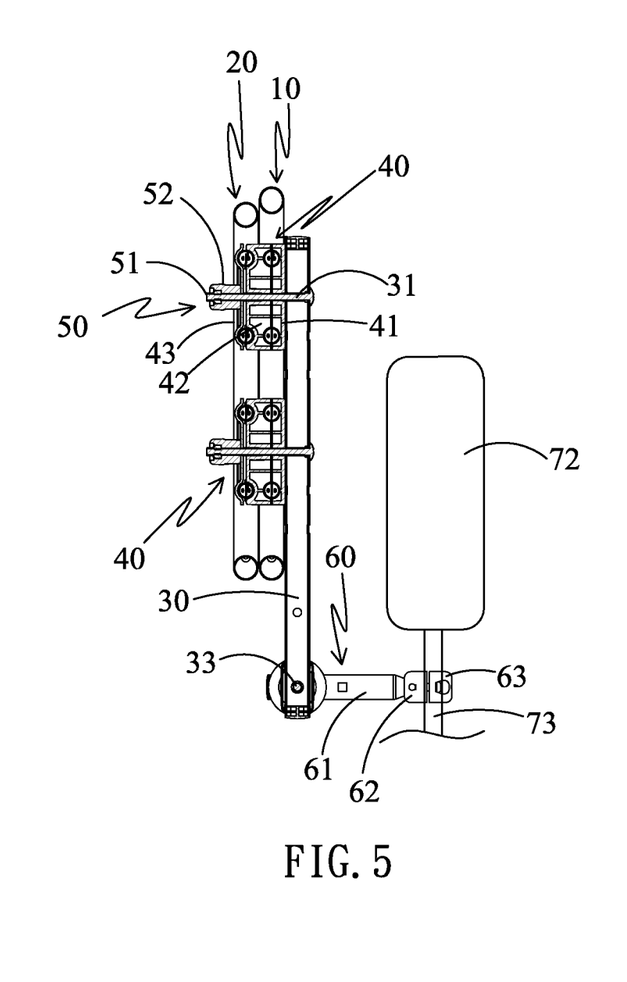
FIG. 5 is a partial cross sectional side view of the pet fence of the present invention.
Figure 6:
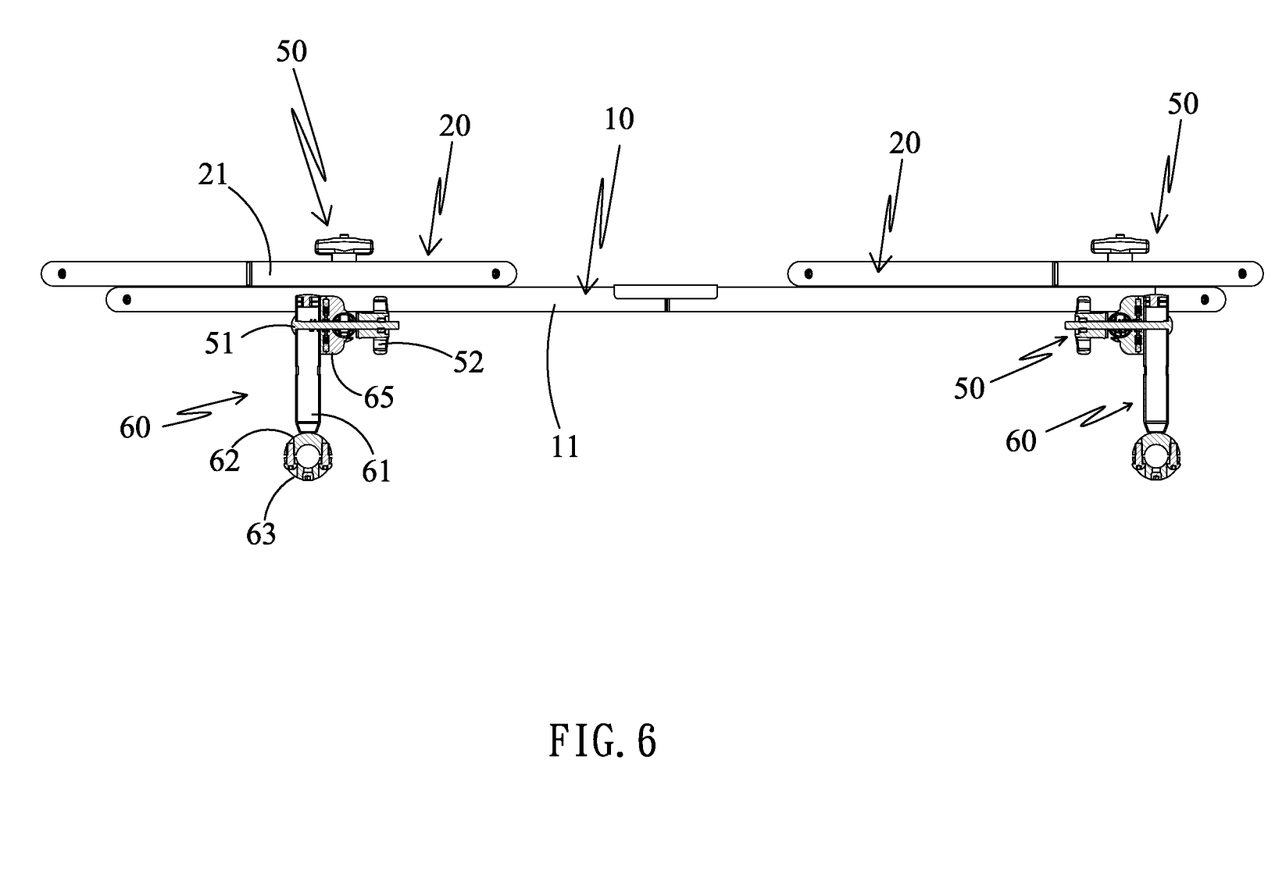
FIG. 6 is a partial cross sectional top side view of the pet fence of the present invention.
Figure 7:
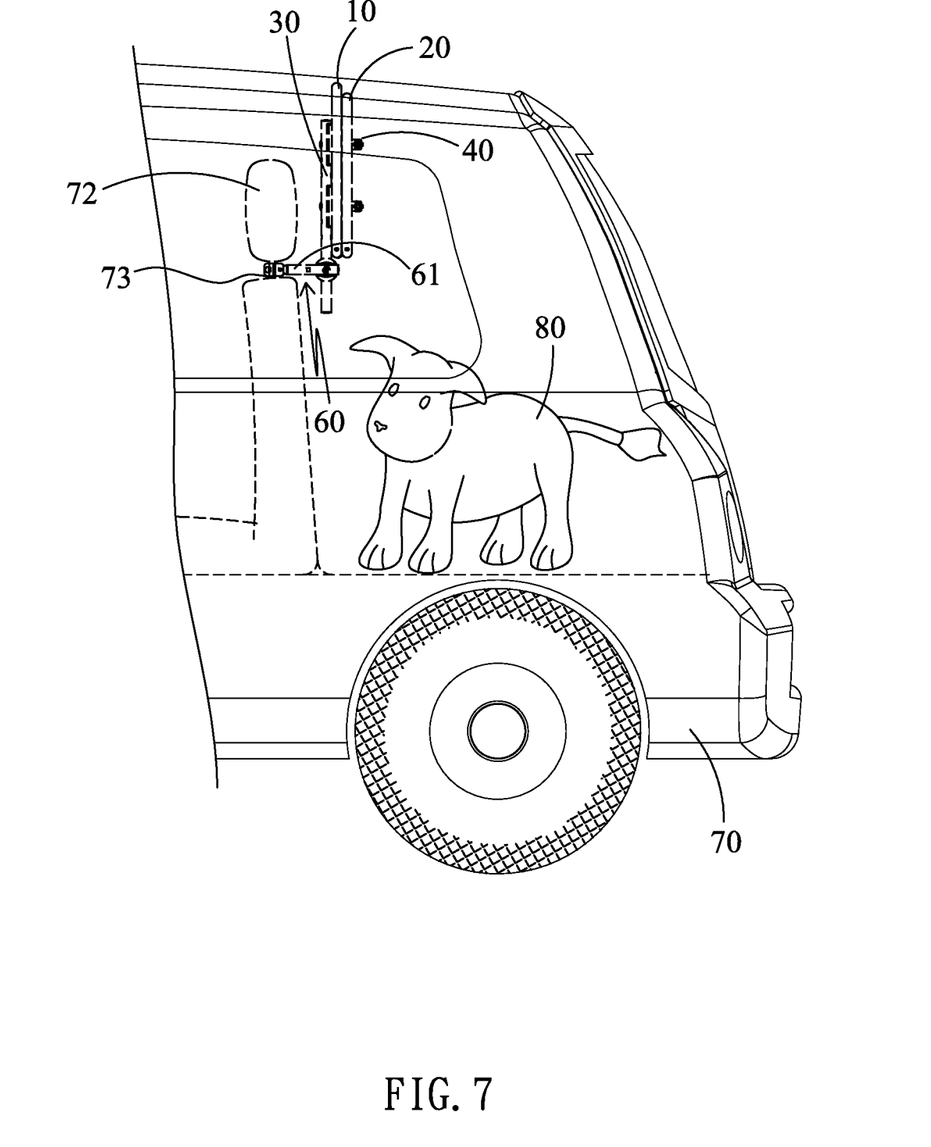
FIG. 7 is a side view to show a pet is separated from the driver in a vehicle.
Figure 8:
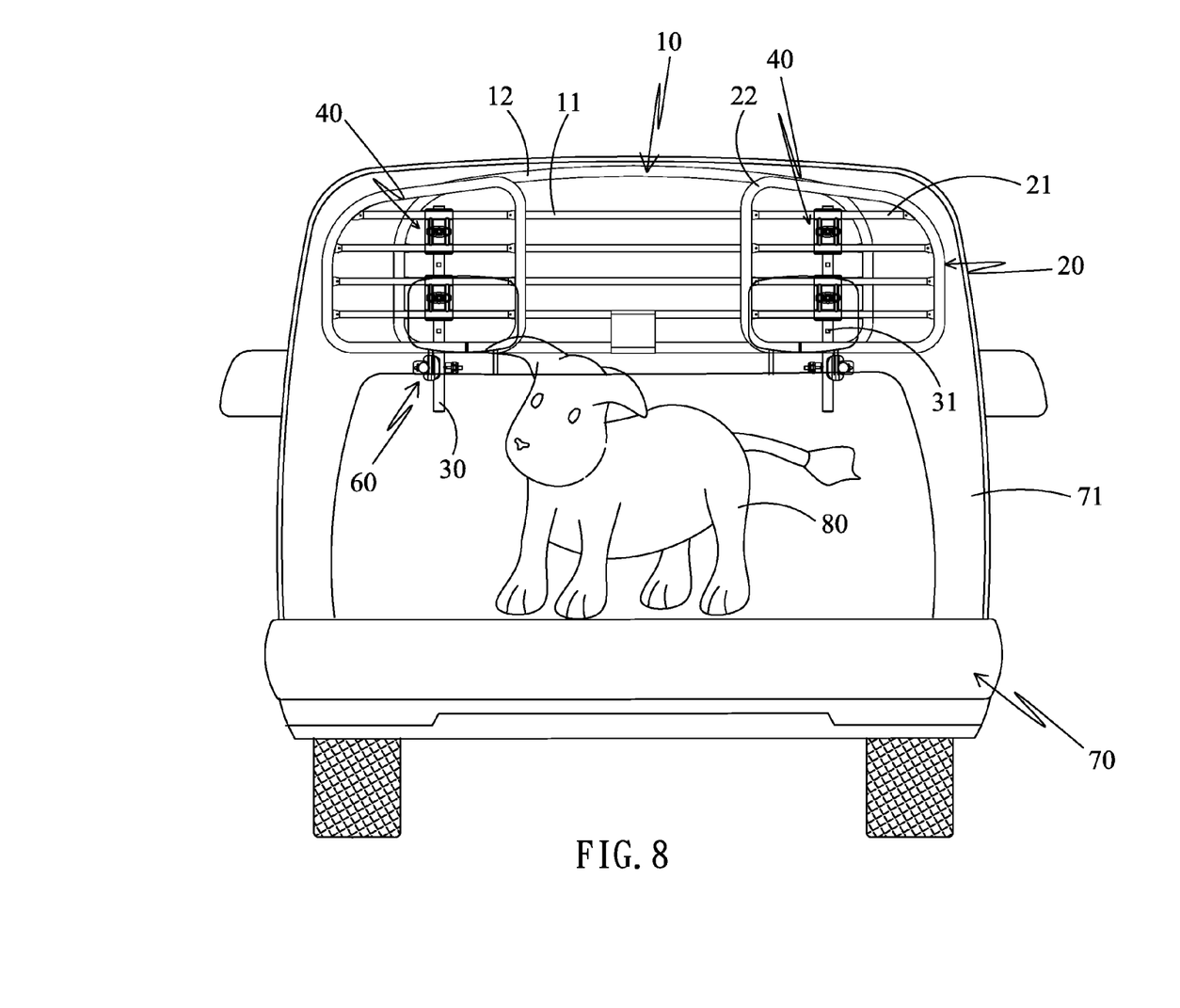
FIG. 8 is a rear end view to show a pet is separated from the driver in a vehicle.

As shown in FIGS. 7 and 8, the pet fence is connected to the headrest rod 73 of the seat 72 of the vehicle 70 so as to separate the space 71 into two individual rooms where the pet 80 is restricted between the rear end of the vehicle 70 and the pet fence, and the pet 80 is isolated from the driver. In other words, the pet 80 cannot enter the room where the driver sits. The two second parts 20 are adjustable relative to the first part 10 so as to adjust the width of the pet fence to a desired width according to the vehicle 70 of different sizes.

The pet fence requires less number of parts and can be easily operated to adjust the width thereof.

While we have shown and described the embodiment in accordance with the present invention, it should be clear to those skilled in the art that further embodiments may be made without departing from the scope of the present invention.

What is claimed is:

1. A pet fence comprising:

a first part having multiple first bars transversely connected thereto;

at least two second parts each having multiple second bars transversely connected thereto, a width of each second part being smaller than a half width of the first part;

at least two positioning tubes each having first holes defined therethrough, multiple second holes defined through each of the at least two positioning tubes and located at an angle relative to the first holes;

multiple adjustment units each having a first member, a second member and a third member, each adjustment unit cooperatively coupled to a locking unit which extends through one of the first holes of one of the at least two positioning tubes, the first member, the first part, the second member, one of the two second parts and the third member to connect one of the at least two second parts to the first part, and when the locking unit is loosened, the at least two second parts are movable relative to the first part; and at least one clamp unit having a connection tube and an attachment member, a fixed clamp connected to one end of the connection tube, a movable clamp connected to the fixed clamp and adapted to secure the at least one clamp unit to a headrest rod of a seat of a vehicle, the attachment member located between the positioning tube and the connection tube, the connection tube and the attachment member connected to the second holes of the at least two positioning tubes.

2. The pet fence as claimed in claim 1, wherein the first part and the at least two second parts each are an enclosed part.

3. The pet fence as claimed in claim 2, wherein a first enclosed tube is connected to an outer periphery of the first part, and a second enclosed tube is connected to an outer periphery of each of the second parts.

4. The pet fence as claimed in claim 1, wherein the first member is positioned to face the first part and has a first groove in a first side thereof so as to accommodate the positioning tube, the first member has at least two second grooves in a second side thereof so as to accommodate two of the first bars of the first part, the second member is located between the first part and one of the two second parts, the second member has at least two third grooves in a first side thereof, at least two fourth grooves defined in a second side of each of the second members, the at least two third grooves accommodating two of the first bars of the first part, the at least two fourth grooves accommodating two of the second bars of one of the second parts, and the third member is positioned to face the second part corresponding thereto and has at least two fifth grooves defined in a first side thereof so as to accommodate two second bars of the second part corresponding thereto.

5. The pet fence as claimed in claim 1, wherein the locking unit comprises a bolt and a nut which is connected to the bolt.

6. The pet fence as claimed in claim 1, wherein the connection tube of the at least one clamp unit has multiple passages which are positioned corresponding to the second holes of the at least two positioning tubes.

* * * * *